March 28, 1961 C. B. PEAR, JR 2,977,422
WEB TRANSPORT SPEED CONTROL
Filed May 24, 1955
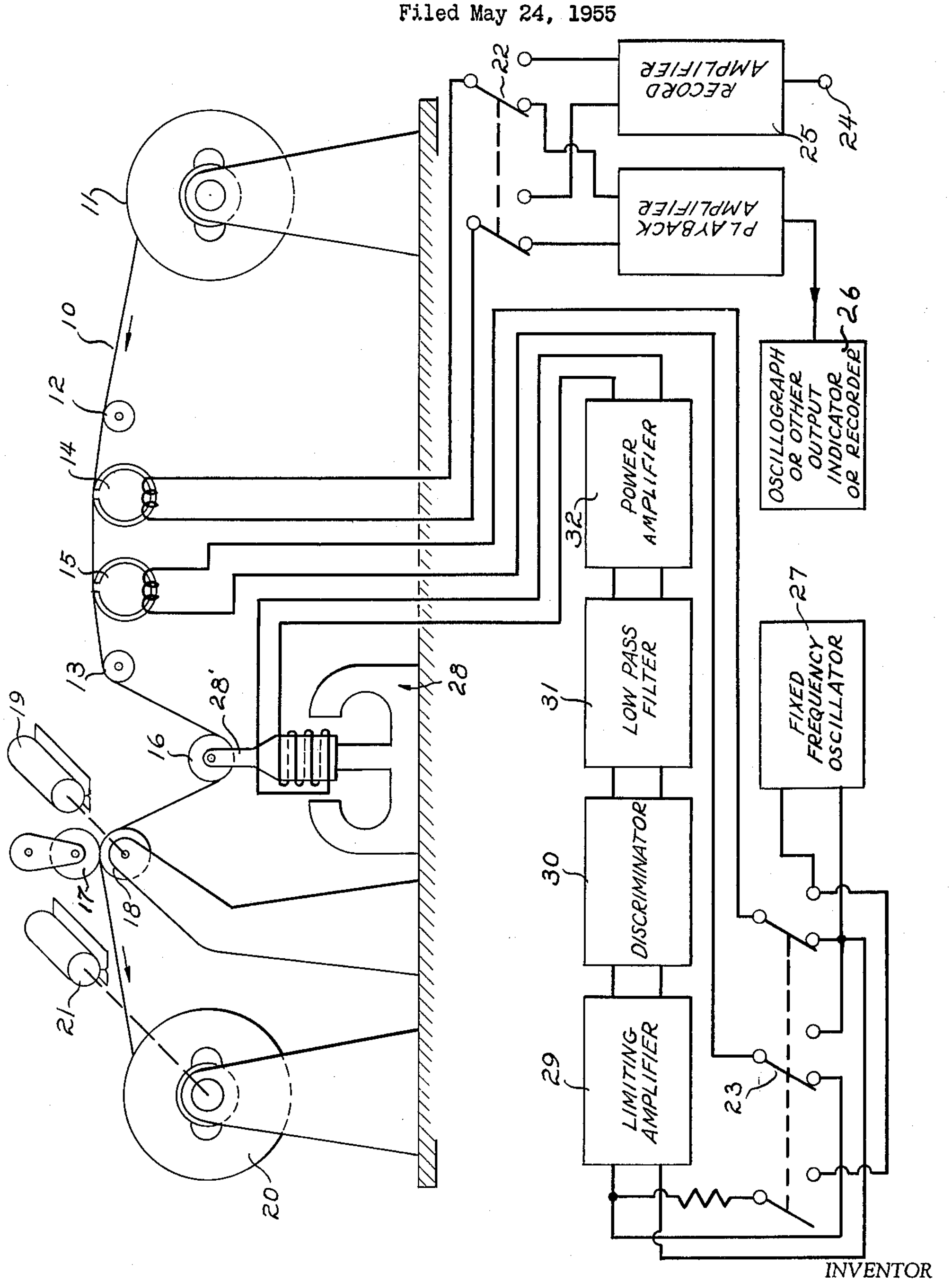
INVENTOR
CHARLES B. PEAR JR.
BY Scrivener & Parker
ATTORNEYS

United States Patent Office 2,977,422

Patented Mar. 28, 1961

2,977,422

WEB TRANSPORT SPEED CONTROL

Charles B. Pear, Jr., College Park, Md., assignor, by mesne assignments, to Minneapolis-Honeywell Regulator Company, a corporation of Delaware Filed May 24, 1955, Ser. No. 510,756

1 Claim. (Cl. 179—100.2)

This invention relates to web or strand transport means and more particularly to a magnetically controlled speed fluctuation responsive means for reproducing in subsequent transports the inherent speed fluctuations occurring during an initial transport of the web or strand.

Since the invention involves the use of a control signal which is impressed in a magnetic path on a moving medium during the initial transport it should be explained at the outset that for purposes of convenience in describing the invention the term "recording" will hereafter refer to the initial transport movement of the web or strand and the term "play-back" will refer to subsequent transports. Although the invention is particularly useful for use with magnetic tape or wire recorders, the two quoted terms should not be understood as limiting the invention to use only with magnetic tape or wire recorders since it will become apparent that the invention has application to other fields, as for instance motion picture films and the like.

For example, in tape or wire recorders whose record medium is transported at a substantially uniform speed, tape and reel friction and minute voltage fluctuations in the transport driving means cause inherent instantaneous variable speed fluctuations of the medium which, unless the recording and play-back speeds are exactly correlated, cause undesirable distortion of the played back message. Ordinarily an attempt is made to achieve exactly equal recording and play-back speed by moving the medium at an absolute unchanging speed for both recording and play-back. As a practical matter this is extremely difficult to achieve requiring expensive high quality workmanship and heavy components to provide mechanical filtering with low resonant frequency. It is therefore an object of the present invention to provide an extremely simple, inexpensive means for overcoming the effects of the described, inherent speed fluctuation in a moving medium by merely causing the medium during its play-back movement to move with the same variations in speed that occurred during recording.

Another object of the invention is the provision of novel speed control means for a moving web or strand which is instantaneously responsive during play-back to variations in a magnetic control signal track generated on the medium during recording.

Yet another object of the invention is the provision of movable mechanical speed control means which instantaneously acts physically on the moving medium to increase or retard its speed during play-back in response to sensed variations in a constant frequency control signal impressed on the medium during recording.

A subsidiary object of the invention is to provide means which not only reproduces during play-back the speed fluctuations that occurred during recording, but also substantially eliminates the effects of speed variations in the medium that occur only during the play-back movement.

Other objects and their attendant advantages will become apparent as the following detailed description is read in conjunction with the accompanying single drawing which is a diagrammatic illustration of apparatus embodying the invention.

A medium 10, which may comprise magnetic record tape, is wound on a reel 11 and is fed over suitable idler pulleys 12 and 13 past magnetic heads 14 and 15. From idler 13 the tape is led around a movable idler 16, forming a variable bight in the tape, from whence it passes between a pair of cooperating driving rollers 17 and 18 at least one of which may be driven at a constant speed by a motor 19 for transporting the record 10 past the heads 14 and 15 at an average uniform rate which may vary instantaneously due to frictional resistance of the tape or reel or due to other inherent mechanical or electrical discrepancies in the apparatus. From the driving rollers 17 and 18 the tape passes to the usual take up reel 20 which may be driven by a suitable motor 21.

The magnetic heads 14 and 15 are of conventional construction and, in the apparatus illustrated, each serves as a recording and a play-back head under the respective control of double throw switches 22 and 23, both of which are illustrated in their play-back position. The head 14 is designated a data head which, when switch 22 is in the recording position, records onto tape 10 information received from an input 24 through an amplifier 25. During the recording process constant speed motor 19 advances the tape 10 past the heads 14 and 15 at a substantially uniform rate which is varied, as aforesaid, by extraneous speed fluctuations resulting from inherent friction and miscellaneous minute defects in the apparatus.

It should be apparent that these speed fluctuations will cause the message during recording to be disposed on the tape sometimes crowded and sometimes elongated in length from the amounts of tape which the message would occupy if the tape were actually recording at a true uniform speed. Thus during playback, the recorded data, which may be either of an audible or a non-audible nature of the type received on an oscilloscope or other visual indicator 26, would be distorted in both amplitude and frequency by the speed fluctuations of the tape during recording.

The present invention eliminates the effects of this speed fluctuation by means of the head 15 which serves during recording to impress on the tape a constant frequency control signal derived from a fixed frequency oscillator 27. This fixed frequency is recorded on the tape preferably in a path parallel to the track of the recorded information from the data head 14, though it might be recorded on the same track with the data as would be the case in a wire recorder, if this permitted a frequency which could be separated readily. As the tape moves during recording with the aforesaid inherent speed fluctuation, the fixed frequency from head 15 is recorded on the tape with its magnetic track disposed on the tape modulated by its speed fluctuations to exactly the same extent as is the information being recorded from the data head 14. Thus during playback, the head 15 receives a signal modulated in accordance with instantaneous change of tape speed, which modulated signal may be utilized to actuate electro-responsive mechanical means to instantaneously retard or increase the speed of the tape with precisely the same variations as occurred during recording.

The electro-responsive mechanical means illustrated in the drawing comprise the aforementioned movable idler 16 which is rotatably mounted atop the armature 28' of an electro-magnetic device 28 which, when the switch 23 is in the play-back position shown, is connected to the head 15 through conventional electronic components which may comprise a limiting amplifier 29, discriminator 30, low pass filter 31, and a power amplifier 32. The member 28, which I refer to as a "driver," may be thought of as analogous to a common dynamic loudspeaker and may be any structure wherein a current through a coil produces a motion in an armature or the like which is reversed when the coil current is reversed. Thus the moving idler 16 is moved upwardly and downwardly with extreme rapidity in accordance with the modulation in the control frequency track resulting from the aforesaid fluctuation in tape speed. On its upward movement the bight in the tape is momentarily decreased to produce slight slackness in the tape causing it to be momentarily slowed in its advance across the heads 14 and 15, this reduction in speed corresponding to an identical reduction in speed which previously occurred during recording. In like fashion momentary speed increase during recording is reflected in a down movement of idler 16 during play-back to thus momentarily increase tape speed across the heads.

For the non-recorded speed fluctuations which would normally occur only during play-back (speed fluctuations of a similar nature which occurred during recording but not necessarily at the same time and place) the discriminator 30 detects the change in frequency of the recorded control signal brought about by the variation in tape speed during play-back so that a signal is transmitted to the driver 28 to compensate the speed of the tape for this play-back speed fluctuation in a similar fashion as for the recorded modulation of the control signal.

Thus the driver of the invention serves two purposes: 1. It imparts to the tape during play-back the same speed variation which occurred during recording; 2. It compensates tape speed during play-back for variations in tape speed that occur only during play-back.

During recording the driver forms no function but merely acts as a weighted tensioning means for the tape.

It will be apparent, of course, that the apparatus disclosed is exemplary only, and that the speed controller of the invention may be utilized with various forms of web transport means wherein the web may be any one of various types where it may be desired to have the web traverse a given path with the same speed fluctuations experienced by it on a previous traverse, as for example in motion picture films. The invention, however, is particularly suited for use with tape recorders since it is in this field that it is becoming increasingly important that rapid and accurate speed control be effective. It will also be apparent that with the use of the speed control of the present invention accurate recorders can be produced on a rapid assembly basis since it eliminates the costly and time consuming workmanship required to produce tape transport means of unvarying speed in both the recording and play-back movement of the tape. In the appended claims wherein the term "web" is employed this should be understood as including a web, strand or tape.

The described apparatus of the invention is obviously susceptible of many modifications and these are intended to be included within the scope of the invention without departing from the scope and spirit of the appended claim.

What is claimed is:

In a web transport mechanism for magnetic recording and reproducing equipment wherein a magnetic record member carries a constant frequency control record, the combination comprising web driving means for moving said record member at a relatively constant speed along a predetermined path, record transducing means for producing electrical signals in accordance with said control record, frequency responsive means for producing control signals in response to changes in the frequency of said electrical signals due to relatively minute changes in the speed of the motion of said record member, control means responsive to said control signals for modifying said path of said record member to counteract said changes in the speed of said member, said control means including a record member guide means for defining a bight in said record member along said path, said guide means being translationally movable along a line perpendicular to the path of said record member and in the general plane thereof, and driver means for moving said guide means along said line in response to said control signals, said driver means comprising a magnetic core means and an associated movable armature bearing an associated signal coil, said guide means being movable directly by said armature whereby to vary the length of the bight in response to said control signals and, in turn, vary the instantaneous speed of the record member along said path.

References Cited in the file of this patent

UNITED STATES PATENTS

| | | |
|---|---|---|
| 2,345,765 | Michel | Apr. 4, 1944 |
| 2,396,409 | Berzer | Mar. 12, 1946 |
| 2,474,620 | Fath | June 28, 1949 |
| 2,496,103 | Neufeld | Jan. 31, 1950 |
| 2,656,419 | Dingley | Oct. 20, 1953 |
| 2,729,454 | Vides | Jan. 3, 1956 |